United States Patent [19]

Bartholomew

[11] 4,310,185

[45] Jan. 12, 1982

[54] QUICK CONNECTOR FOR TUBING

[76] Inventor: Donald D. Bartholomew, 5771 McKinley, Marine City, Mich. 48039

[21] Appl. No.: 142,010

[22] Filed: Apr. 21, 1980

[51] Int. Cl.³ .............................................. F16L 17/02
[52] U.S. Cl. .................................... 285/369; 285/382; 285/423; 285/DIG. 22
[58] Field of Search ............... 285/233, DIG. 22, 369, 285/322, 323, 423, 382, 39, 53, 66, 29 L, 383, 407, 417

[56] References Cited

U.S. PATENT DOCUMENTS

| 1,622,768 | 3/1927 | Cook et al. ....................... 285/369 X |
| 2,781,207 | 2/1957 | Detweiler et al. ................... 285/233 |
| 3,405,957 | 10/1968 | Chakroff .......................... 285/369 X |
| 3,888,523 | 6/1975 | Bartholomew ..................... 285/382 |
| 3,997,195 | 12/1976 | Batholomew .................. 285/382 X |
| 4,006,922 | 2/1977 | Bartholomew ....................... 285/39 |

FOREIGN PATENT DOCUMENTS 1297162 11/1972 United Kingdom ............... 285/369

Primary Examiner—Dave W. Arola
Attorney, Agent, or Firm—Harness, Dickey & Pierce

[57] ABSTRACT

Disclosed is a quick connector which facilitates the spicing of tubing in communicating relationship. The quick connector has an inner tubular sleeve adapted to fit closely and coaxially over aligned tubing end portions and an O-ring seal positioned at each end of the sleeve and over each tubing end portion with an inner clamping sleeve, outer clamping sleeve and locking sleeve positioned respectively coaxially thereover.

14 Claims, 4 Drawing Figures

QUICK CONNECTOR FOR TUBING

BACKGROUND AND SUMMARY OF THE INVENTION

The present invention relates to a connector which mechanically interlocks one tubing end with another tubing end to splice the ends together in sealed and communicating relationship. The connector is an unthreaded, quick connect and disconnect design particularly well suited to be made of plastic material and provides a splice without use of bonding or welding.

It is often desirable to join or splice the ends of two tubes together in sealed and communicating relationship so that fluid may pass from one tube to the other tube without leaking into the environment. For example, in automotive vehicles tubes are employed as power steering fluid lines, fuel lines, oil lines, vacuum lines and the like, and it is often desirable or necessary to splice such lines or tubes during the original installation or repair thereof. To be satisfactory, a splice connector must meet certain requirements. The splice must be of sufficient strength to withstand tensile forces tending to pull the tubing ends apart to interrupt the splice. The splice must also provide a seal to prevent leaking of fluid into the exterior environment under the conditions of use. Other features of a splice connector are not necessarily always required of such connectors but would often be highly desirable. Thus, it would be desirable to have a splicing connector which can be economically made of a polymeric plastic material. In many instances it would be desirable to have a splice which can be easily manipulated, and hence, easily and quickly disconnected when desired and employed in a crowded environment such as in the engine compartment of a vehicle such as an automobile, truck, aircraft and the like. In many instances it also would be desirable to have a splice without bonding or sealing chemicals and to have a splicer connector which can be used for metal, plastic or rubbing tubing.

Wherefore, it is an object of the present invention to provide an improved connector for splicing axially aligned tubing ends in communicating relationship.

The aforementioned features and requirements can be achieved in accordance with the present invention by providing a quick connector for splicing tubing ends, the connector comprising: an inner tubular sleeve; a pair of O-ring seals; an inner clamping sleeve; an outer clamping sleeve; and a locking sleeve as described in more detail hereinafter.

DESCRIPTION OF THE INVENTION

Figure 1:
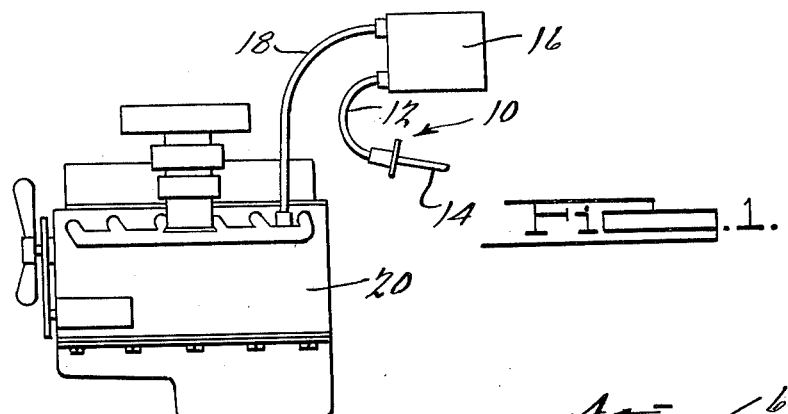
FIG. 1 is an elevational view of a vacuum tubing spliced with a quick connector of the present invention and connected to an automobile engine.

Now referring to FIG. 1, a quick connector of the present invention is designated generally by the numeral 10 and is illustrated splicing vacuum tubes or lines 12 and 14 in communicating relationship. Tubing of many different sizes, materials, and uses can be spliced by a connector made in accordance with the present invention. In particular, connector 10 can be used to splice metal tubing as well as plastic or rubber tubing although for reasons of economy it is contemplated and preferred that connector 10 itself be made generally of plastic material. Because of the ease of manipulation of the various parts of connector 10, it is suitable for use in the engine compartment of a vehicle such as an automobile. Thus, FIG. 1 shows connector 10 splicing vacuum tubing 14 to vacuum tubing 12 which is connected to vacuum reservoir 16 which itself is connected by tubing 18 to the source of vacuum provided by the intake manifold of automobile engine 20, all of which are, of course, located with an engine compartment of a vehicle. It will be readily apparent from the disclosure hereinafter that a quick connector of the present invention is well adapted for use in crowded environments such as in an engine compartment of an automobile and the like.

Figure 2:
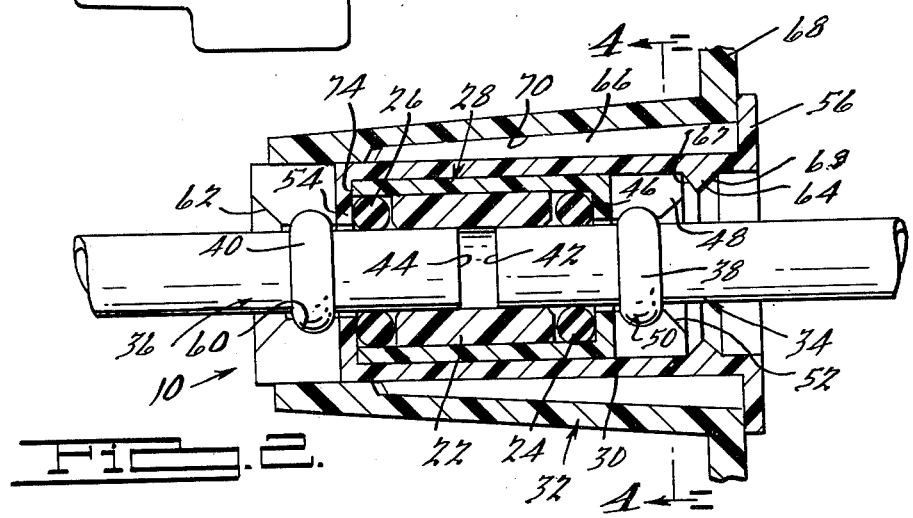
FIG. 2 is a longitudinal sectional view of the quick connector shown in FIG. 1.
Figure 3:
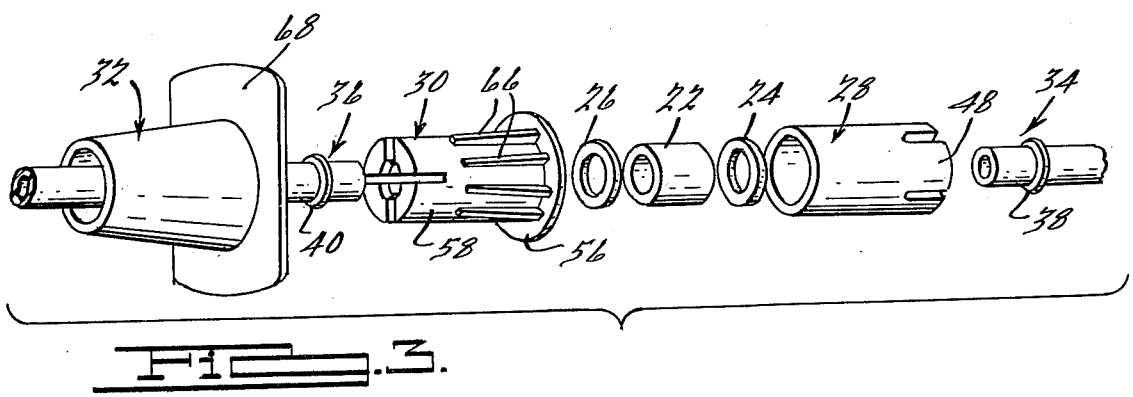
FIG. 3 is an exploded view, in perspective, of the tubing and quick connector of FIGS. 1 and 2 in disassembly but illustrating the relative relationship of the parts thereof.
Figure 4:
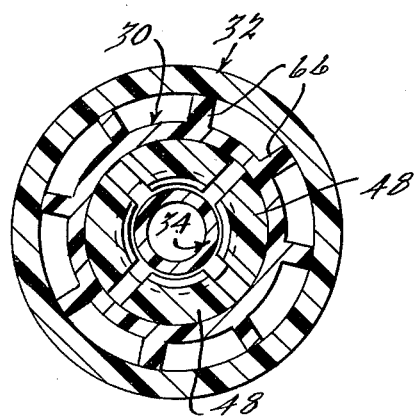
FIG. 4 is a sectional view taken along line 4—4 of FIG. 2.

As shown in detail in FIGS. 2–4, connector 10 broadly comprises: inner tubular sleeve 22, O-ring seals 24 and 26, inner clamping sleeve 28, outer clamping sleeve 30 and locking sleeve 32. After installation of quick connector 10 to splice two tubing ends, each end is snappingly retained by one or the other of inner and outer clamping sleeves 28 and 30, which are locked into snapping engagement with each other by locking sleeve 32. In addition one tubing end portion 34 is inserted through O-ring 24 and into inner tubular sleeve 22 while the other tubing end portion 36 is inserted through O-ring 26 and into the opposite end of inner tubular sleeve 22. O-rings 24 and 26 and inner tubular sleeve 22 provide sealing means for tubing end portions 34 and 36 and are located by cooperating inner and outer clamping sleeves 28 and 30.

Tubing suitable for use with connector 10 includes any tubing having sufficient resistance to collapsing radially inwardly to provide a good sealing engagement with seals 24 and 26. Tubing of circular cross section is preferred for use with connector 10 but eliptical or other cross-sectional configurations are within the broad scope of the invention so long as the corresponding inner surfaces of connector 10 can be suitably configured within the spirit of this invention. Suitable tubing includes metal, such as copper, aluminum or steel tubing as well as plastic and hard rubber tubing. As shown in the figures each tubing end has an end portion 34 or 36. An annular, radially outwardly projecting bead 38 is provided on end portion 34 and an analogous annular bead 40 is provided on end portion 36. Each of said beads is disposed an axial distance from the tubing end faces 42 and 44 of less than half the length of connector 10 but sufficiently long to allow insertion into connector 10 of tubing end portions 34 and 36 so that tubing end faces 42 and 44 are positioned proximate to each other, preferably in end to end abutting relationship within inner tubular sleeve 22.

Inner tubular sleeve 22 has a round tubular shape and has an inner diameter sized to fit closely over end portions 34 and 36 inserted therein. Inner tubular sleeve 22 can function as an intermediate tubing piece between tubing end portions 34 and 36 where the tubing end portions are in proximate relationship as shown in FIG. 2 rather than in the preferred abutting relationship. An O-ring seal is provided at each axial end of inner tubular sleeve 22, O-ring 24 being disposed at the right end of inner tubular sleeve 22 and about tubing end portion 34 and O-ring 26 being disposed at the left end of inner tubular sleeve 22 and about tubing end portion 36. O-rings 24 and 26 are conventional O-ring seals such as can be made of resilient synthetic rubber and the like and are sized as to be sealably compressed between the associated tube end portion and inner clamping sleeve 28.

Inner clamping sleeve 28 has a generally tubular shape with an inner diameter sized to fit closely over inner tubular sleeve 22 and compressibly over O-rings 24 and 26. The right end of clamping sleeve 28 carries means for snappingly gripping annular bead 38 of tubing end portion 34. Thus, clamping sleeve 28 has a radially inwardly extending annular flange 46 and has a plurality of integral circumferentially spaced, axially extending fingers 48 extending to the right of flange 46 as viewed in FIGS. 2 and 3. Each finger 48 has a resilient nature and has a radially inwardly facing groove 50 which is adapted to snappingly engage annular bead 38 of tubing end portion 34. Each finger 48 also has a chamfered end face 52.

Outer clamping sleeve 30 has a generally tubular shape with a radially inwardly extending annular stop flange 54 at the left end thereof and a radially outwardly extending annular stop flange 56 at the right end thereof. A plurality of fingers 58 extend axially to the left as viewed in FIG. 2 from stop flange 54. Similarly to fingers 48 of inner clamping sleeve 28, each finger 58 has a resilient nature and has a radially inwardly facing groove 60 which is adapted to snappingly engage annular bead 40 of tubing end portion 36. Each finger 58 has a chamfered end 62. As viewed in FIG. 2 the right end portion of outer clamping sleeve 30 carries an inwardly facing annular projection 64 which has chamfered faces 67 and 69. A plurality of generally axially extending inclined plane sections 66 are circumferentially positioned on the radially outer side of outer clamping sleeve 30, each extending from an axially intermediate position on outer clamping sleeve 30, to stop flange 56, providing a radially outwardly inclined ramp therebetween.

Locking sleeve 32 has a generally truncated hollow cone shape with a radially outwardly extending annular flange 68 at the rightward end thereof. As best shown in FIG. 2, flange 68 extends radially outwardly beyond flange 56 of outer clamping sleeve 30 to provide means by which a suitable tool (not shown in the figures) can grip each of flanges 68 and 56 to withdraw locking sleeve 32 from outer clamping sleeve 30 when disassembly of connector 10 is desired. Locking sleeve 32 has a hollow interior or bore 70 which has an increasing diameter to the right as viewed in FIG. 2. Bore 70 fits closely over outer clamping sleeve 30 to prevent radially outward expansion of fingers 58 and to maintain outer clamping sleeve 30 in snapping engagement with inner clamping sleeve 28. The slope of the radially outer face of inclined plane sections 66 is selected so that locking sleeve 32 is normally retained on outer clamping sleeve 30 by frictional forces but such frictional forces can be overcome by hand manipulation.

Further understanding of the present invention will be obtained from the following description of installation of quick connector 10 to splice tubing end portions 34 and 36 in communicating relationship. First, locking sleeve 32 is advanced over end portion 36 and bead 40 and positioned to the left of bead 40 in the general position shown in FIG. 3. Then outer clamping sleeve 30 is advanced over end portion 36 until bead 40 is snappingly engaged by grooves 60 of fingers 58 and inner clamping sleeve 28 is advanced over end portion 34 until bead 38 is snappingly engaged by grooves 50 of fingers 48. Each finger 58 is resilient in nature and has a chamfered forward end 62 so that upon advancement of outer clamping sleeve 30 over bead 40 each finger 58 is urged radially outwardly until grooves 60 capture bead 40. Similarly, each finger 48 is resilient and has a chamfered forward end 52 which, upon advancement of inner clamping sleeve 28 over annular bead 38, contacts annular bead 38 and forces fingers 48 radially outwardly until bead 38 is captured by grooves 50.

Next, O-ring 24 is placed over end portion 34 which is inserted into one end of inner tubular sleeve 22 and O-ring 26 is placed over end portion 36 which is inserted into the other end of inner tubular sleeve 22. Preferably, but not necessarily, end portions 34 and 36 are inserted into connector sleeve 22 until end faces 42 and 44 are in abutting relationship. It will, of course, be appreciated that end portions 34 and 36 can be advanced into sleeve 22 either simultaneously or sequentially. It will also be appreciated that advancement of end portions 34 and 36 toward each other will be facilitated by manipulating inner clamping sleeve 28 and outer clamping sleeve 30 and will simultaneously result in advancement of outer clamping sleeve 30 over inner clamping sleeve 28 until flange 64 of outer clamping sleeve 30 snappingly engages the ends of fingers 48 of inner clamping sleeve 28. The abutting relationship of end face 74 of inner clamping sleeve 28 and stop flange 54 of outer clamping sleeve 30 cooperates with the aforementioned relationship of flange 64 and fingers 48 to retain outer clamping sleeve 30 in position over inner clamping sleeve 28, which positioning is facilitated by face 68.

Finally, locking sleeve 32 is advanced over outer clamping sleeve 30 and, hence, over inclined plane sections 66 until flange 68 abuts against flange 56. Advancement of locking sleeve 32 over inclined plane sections 66 transmits a clamping force radially inwardly to outer clamping sleeve 30 which transmits the clamping force to inner clamping sleeve 28 and hence, secures the snapping engagement of fingers 48 and 58 on beads 38 and 40 as well as the snapping engagement by projection 64 over the ends of fingers 48 of inner clamping sleeve 28. The slope of inclined plane sections 66 is sufficiently small so that the friction between locking sleeve 32 and inclined plane sections 66 prevents relative axial movement therebetween in normal use but allows withdrawal of locking sleeve 32 when desired.

To disconnect connector 10, locking sleeve 32 is withdrawn to the left in FIG. 2 from its position over outer clamping sleeve 30. Withdrawal of locking sleeve 32 permits the separation of outer clamping sleeve 30 and inner clamping sleeve 28 which is facilitated by chamfered surface 67 of projection 64. Complete separation of the parts of connector 10 can then be achieved by following the installation steps in reverse order.

It will be appreciated that the specific form of the present invention disclosed herein is well calculated to achieve the objects of the present invention. It will also be appreciated that once having benefit of the foregoing disclosure, one skilled in the art will be able to make modifications and variations of the present invention and it is to be understood that the present invention may be varied within the scope of the appended claims without departing from the spirit thereof.

What is claimed is:

1. A quick connector for splicing tubing comprising:
an inner tubular sleeve adapted to fit coaxially over axially aligned opposed tubing end portions;
a pair of sealing rings, one positioned adjacent each axial end of said inner tubular sleeve, one of said pair adapted to fit over one of said tubing end portions, the other of said pair adapted to fit over the other of said tubing end portions;
an inner clamping sleeve fit closely over said inner tubular sleeve and said sealing rings, said inner clamping sleeve having a generally tubular shape and having means for removably attaching to the one of said tubing end portions;
an outer clamping sleeve fit closely over said inner clamping sleeve and having means for removably attaching thereto, said outer clamping sleeve having a generally tubular shape and having means for removably attaching to the other of said tubing end portions; and
a locking sleeve coaxially positioned over said outer clamping sleeve, said locking sleeve having a generally tubular shape and having means for removably attaching to said outer clamping sleeve.

2. A connector as recited in claim 1 wherein said means for removably attaching to said one of said tubing end portions comprises a plurality of resilient fingers, each of said fingers having a radially inwardly facing groove adapted to snappingly grip an annular bead on said one tubing end portion.

3. A connector as recited in claim 2 wherein said means for removably attaching to the other of said tubing end portions comprises a plurality of resilient fingers, each of said fingers having a radially inwardly facing groove adapted to snappingly grip an annular bead on said other tubing end portion.

4. A connector as recited in claim 3 wherein said outer clamping sleeve has a radially inwardly extending flange at one end thereof and a radially inwardly extending projection at the other end thereof, said flange providing stop means preventing further advancement of said outer clamping sleeve over said inner clamping sleeve and said projection snappingly engaging on said fingers of said inner clamping sleeve.

5. A connector as recited in claim 4 wherein said outer clamping sleeve has a plurality of inclined plane sections on the radially outer side thereof and said locking sleeve has a friction fit over said inclined plane sections.

6. A connector as recited in claim 5 wherein each of said outer clamping sleeve and said locking sleeve have radially outwardly extending flanges at one end thereof, said flanges being in abutting relationship.

7. A connector as recited in claim 6 wherein each of said fingers of said inner clamping sleeve and of said outer clamping sleeve has a chamfered radially inwardly and forwardly facing surface to facilitate advancement over a bead on one or the other of said tubing end portions.

8. A quick connector as recited in claim 7 wherein said inner tubular sleeve, inner clamping sleeve, outer clamping sleeve and locking sleeve are made of polymeric plastic material.

9. A connector as recited in claim 1 wherein said means for removably attaching to the other of said tubing end portions comprises a plurality of resilient fingers, each of said fingers having a radially inwardly facing groove adapted to snappingly grip an annular bead on said other tubing end portion.

10. A connector as recited in claim 9 wherein each of said fingers of said inner clamping sleeve and of said outer clamping sleeve has a chamfered radially inwardly and forwardly facing surface to facilitate advancement over a bead on one or the other of said tubing end portions.

11. A connector as recited in claim 1 wherein said outer clamping sleeve has a radially inwardly extending flange at one end thereof and a radially inwardly extending projection at the other end thereof, said flange providing stop means preventing further advancement of said outer clamping sleeve over said inner clamping sleeve and said projection snappingly engaging on said fingers of said inner clamping sleeve.

12. A connector as recited in claim 1 wherein said outer clamping sleeve has a plurality of inclined plane sections on the radially outer side thereof and said locking sleeve has a friction fit over said inclined plane sections.

13. A connector as recited in claim 1 wherein each of said outer clamping sleeve and said locking sleeve have radially outwardly extending flanges at one end thereof, said flanges being in abutting relationship.

14. A quick connector as recited in claim 1 wherein said inner tubular sleeve, inner clamping sleeve, outer clamping sleeve and locking sleeve are made of polymeric plastic material.

* * * * *